United States Patent
Pinto et al.

(10) Patent No.: US 9,594,846 B2
(45) Date of Patent: Mar. 14, 2017

(54) CLIENT SIDE CACHING

(75) Inventors: Sweekar Hillary Pinto, Karnataka (IN); Govindaraj Anand, Karnataka (IN); Binh Truong, Sunnyvale, CA (US); Sankar Ram Sundaresan, San Jose, CA (US); Kumar Swamy Vk, Karnataka (IN)

(73) Assignee: Helwett-Packard Development Company, L.P., Houston, TX (US)

( * ) Notice: Subject to any disclaimer, the term of this patent is extended or adjusted under 35 U.S.C. 154(b) by 1117 days.

(21) Appl. No.: 13/208,186

(22) Filed: Aug. 11, 2011

(65) Prior Publication Data

US 2013/0041970 A1    Feb. 14, 2013

(51) Int. Cl.
  G06F 15/167    (2006.01)
  G06F 17/30     (2006.01)
  H04L 29/08     (2006.01)

(52) U.S. Cl.
  CPC ...... *G06F 17/30902* (2013.01); *H04L 67/289* (2013.01); *H04L 67/2842* (2013.01)

(58) Field of Classification Search
  CPC ............... H04L 67/2842; H04L 67/289; H04L 63/0428; G06F 17/30902; G06F 15/167; G06Q 30/0261; G06Q 30/0269; G06Q 30/0264
  See application file for complete search history.

(56) References Cited

U.S. PATENT DOCUMENTS

| 6,654,814 B1* | 11/2003 | Britton .............. G06F 17/30905 707/E17.121 |
| 8,209,291 B1* | 6/2012 | Ma .................... G06F 17/30442 707/641 |
| 8,782,637 B2* | 7/2014 | Khalid ...................... G06F 8/61 718/1 |
| 2003/0041147 A1* | 2/2003 | van den Oord ....... G06F 17/276 709/227 |
| 2006/0070090 A1* | 3/2006 | Gulkis .......................... 719/328 |
| 2006/0225132 A1* | 10/2006 | Swift ..................... G06F 21/33 726/11 |
| 2007/0101061 A1* | 5/2007 | Baskaran .......... G06F 17/30902 711/118 |
| 2008/0098041 A1 | 4/2008 | Chidambaran et al. |
| 2011/0167486 A1* | 7/2011 | Ayloo .................... G06Q 10/00 726/7 |

(Continued)

FOREIGN PATENT DOCUMENTS

WO    2009144688 A2    12/2009

OTHER PUBLICATIONS

Chris Wuestefeld; "Client-side Caching for .NET Applications"; Jan. 26, 2005; http://www.codeproject.com/KB/cs/localcaching.aspx#CreatingaCacheManager3.

(Continued)

*Primary Examiner* — Ario Etienne
*Assistant Examiner* — Kidest Mendaye
(74) *Attorney, Agent, or Firm* — Fabian VanCott

(57) ABSTRACT

A method for client side caching includes, with a client system, running a proxy caching application designed for execution on a proxy server, with a content presentation application running on the client system, accessing content from a server communicatively coupled to the client system, and with the proxy caching application, transparently caching the content into a cache system of the client system.

19 Claims, 6 Drawing Sheets

(56) References Cited

U.S. PATENT DOCUMENTS

2011/0219413 A1* 9/2011 Krikorian ............ G11B 27/034
                                                                         725/109

OTHER PUBLICATIONS

"Using Client-side Cache Solutions and Server-side Caching Configurations to Improve Internet Performance"; Oct. 3, 2006; http://newestindustry.org/2006/10/03/using-client-side-cache-solutions-and-server-side-cachingconfigurations-to-improve-internet-performance/.

* cited by examiner

CLIENT SIDE CACHING

BACKGROUND

Many types of computing devices that provide content such as music, videos, news, and other types of content are available to users. In some markets, users do not wish to pay a higher price for a fully functional computing system in order to view such content. Users in such markets generally prefer less costly devices that still provide the user with the type of content they are interested in viewing. Thus, computing system manufacturing entities may provide such simplified computing devices designed primarily for displaying media content to users.

Simplified computing devices are designed primarily for obtaining media content over a network such as the Internet and displaying that content to a user in an intuitive manner. These devices rely heavily on obtaining new content from the Internet. In some cases, internet access for such devices may be relatively slow or non-existent. Thus, it may take a long time for the user to retrieve desired content.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

Figure 1:
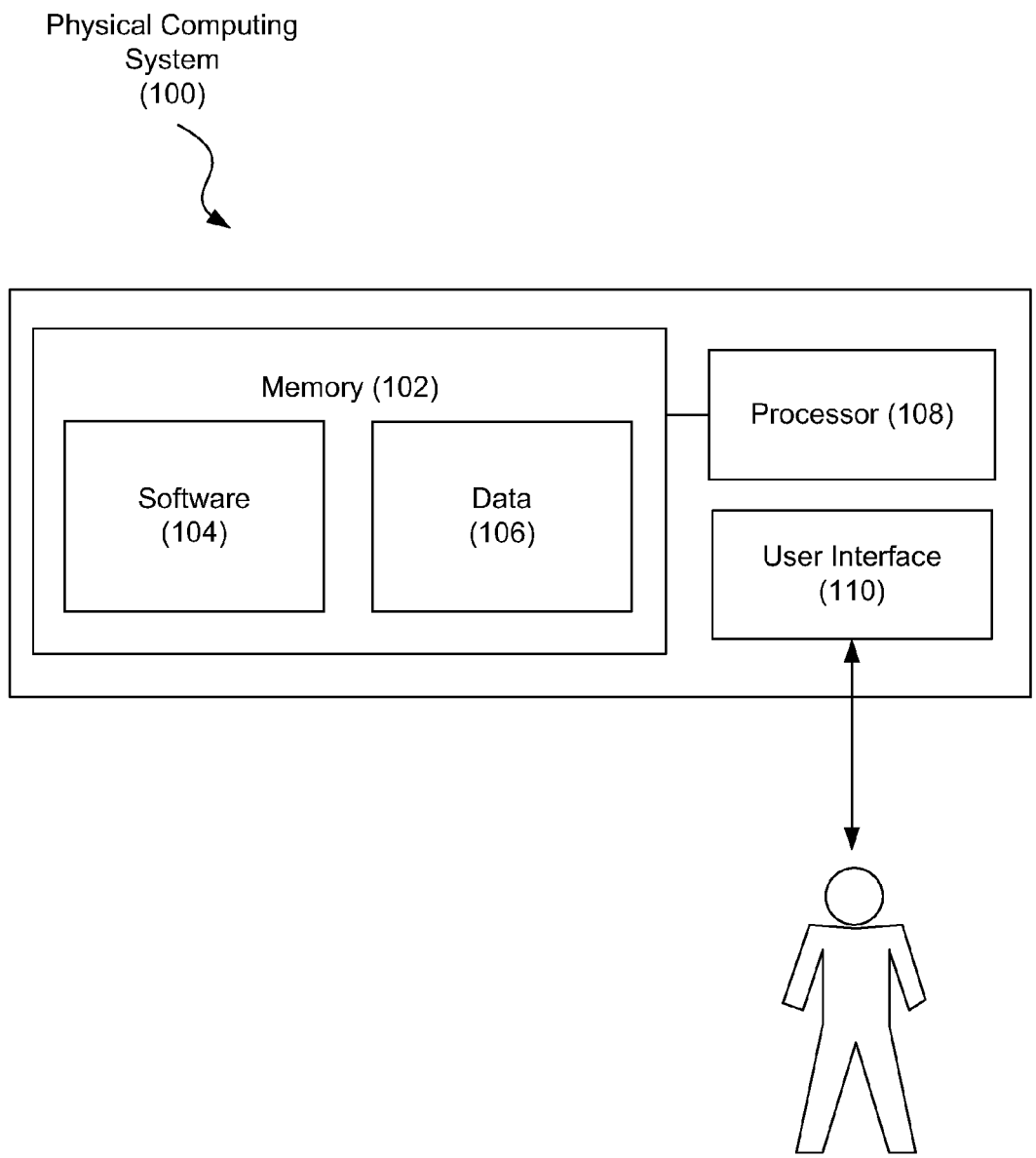
FIG. 1 is a diagram showing an illustrative physical computing system, according to one example of principles described herein.

As mentioned above, simplified computing devices are designed primarily for obtaining media content over a network such as the Internet and displaying that content to a user in an intuitive manner. These devices rely heavily on obtaining new content from the Internet. In some cases, internet access for such devices may be relatively slow or non-existent. Thus, it may take a long time for the user to retrieve desired content.

Network structures have features designed to increase the rate at which content is delivered from content providing servers to content retrieving client devices. One such feature is the use of proxy servers. A proxy server is a server that is connected to multiple client devices as well as a content providing server. As those client devices request data from a content providing server, the request is first sent to the proxy server. The proxy server then requests the content from the content providing server on behalf of the requesting client device. Proxy servers often include caching applications that will place content requested on behalf of client devices into cache system of the proxy server. Thus, when the client device requests the cached content again, or when a different client device requests the cached content, the proxy server does not have to request the content from the content providing server. This increases the rate at which the client device receives the content and reduces the traffic load on the network.

Although a proxy server connected between a client device and a content providing server may increase the rate at which content is retrieved, there may be times when the client device is unable to access the Internet and therefore will not be able to access the proxy server. Alternatively, internet access may be available to the client device, but the connection may be too slow to practicably obtain desired content.

In light of this and other issues, the present specification discloses a method for client side caching that will allow the client device to cache content locally in a manner similar to that of a proxy server. This will increase the rate at which content can be accessed. Additionally, it will allow the content to be accessed when there is either very slow or no Internet access available to the client device.

According to certain illustrative examples, a caching application that is designed for caching content on a proxy server or other type of network server is run on the client device. An example of such a caching application is an open source application referred to as Squid. Instead of being configured to cache content accessed by multiple client devices, the caching application is configured to cache content only for the client system. Thus, applications that present content to a user will request the content from the proxy server caching application running locally on the client device. The proxy server caching application will then request the data from the network as if it were a proxy server requesting content on behalf of the client device.

Through use of systems and methods embodying principles described herein, content retrieved by a client device from a content providing server will be cached locally on the client device that requests the data. As the content presentation applications running on the client device access content that has previously been accessed by the client device, the proxy server caching application will readily provide that content to those applications without having to access the Internet. Thus, the content will be provided to the user in a short amount of time and the load on the network will be reduced.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Throughout this specification and in the appended claims, the term "simplified computing device" refers to a computing device with less than full functionality and is designed primarily for displaying media content to a user.

Throughout this specification and in the appended claims, the term "proxy server caching application" refers to a software application that is designed to run on a proxy server and cache content that is requested by client devices connected to that proxy server.

Throughout this specification and in the appended claims, the term "content presentation application" refers to an application designed to display particular types of content to a user. An example of a content presentation application is a web browser designed to display web content to a user.

Referring now to the figures, FIG. 1 is a diagram showing an illustrative physical computing system (100) to be used for decision support. According to certain illustrative examples, the physical computing system (100) includes a memory (102) having software (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system (100). The other applications may include content presentation applications and a proxy server caching application. The data (106) may include various media content such as text, music, and movies.

A user interface (110) may provide a means for the user to interact with the physical computing system (100). The user interface may include any collection of devices for interfacing with a human user. For example, the user interface (110) may include an input device such as a keyboard or mouse and an output device such as a monitor.

Figure 2:
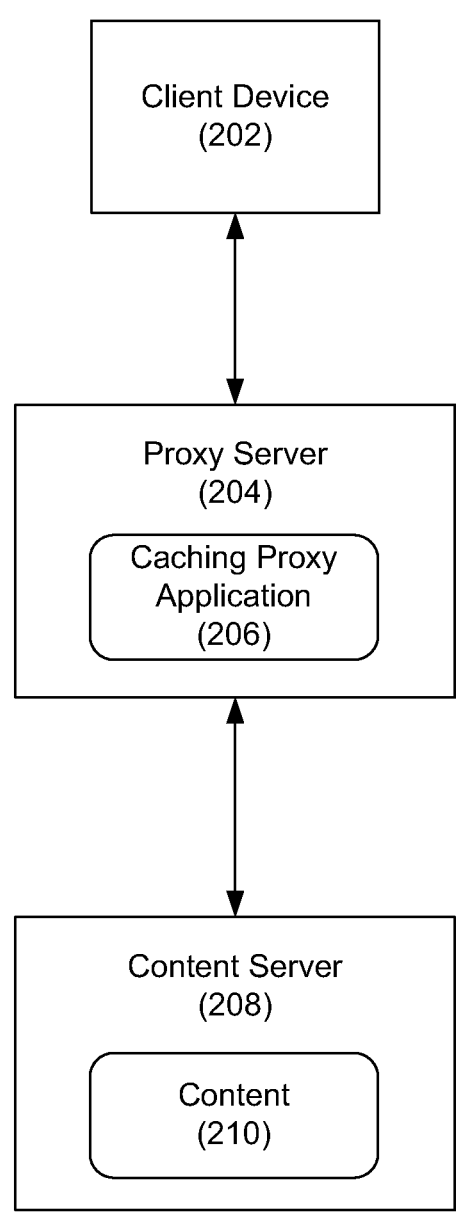
FIG. 2 is a diagram showing an illustrative proxy server caching process, according to one example of principles described herein.

FIG. 2 is a diagram showing an illustrative proxy server caching process (200). According to certain illustrative examples, a client device (202) intends to retrieve content (210) from a content server (208). The client device sends a request for that content (210) to a proxy server (204). That proxy server then requests the desired content (210) from the content server (208) on behalf of the client device (202). After the proxy server receives the content (210) from the content server (208), a proxy server caching application (206) running on the proxy server (204) then caches the content (210). The proxy server (204) also provides that content (210) to the client device (202). Whenever a subsequent request for that content is made by any client device connected to the proxy server (204), the proxy server retrieves the content (206) from cache rather than having to request that content (210) from the content server (208).

The client device (202) may be any type of client computing device including, but not limited to, a laptop computer, a desktop computer, a tablet computer, or a mobile smart phone. In one example, the client device is a simplified computing device designed primarily for providing media content to a user. This type of client device may retrieve content from a server that maintains content designed specifically for the client device (202).

The proxy server may be embodied on any networking device on the network path between the client device (202) and the content server (208) that maintains content (210) for the client device (202). The proxy server (204) will often run a caching application (206) that is designed to cache content requested on behalf of several client devices connecting to the content server (208) through the proxy server (204).

A cache system is a memory that temporarily stores data from a source with a slower access time. When subsequent requests for the same data are made, then the cache system provides faster access time to that data. This is often done transparently. This means that the application or system that requests data from a source with a slow access time, the application or system does not know that it is requesting data from a cache. For example, if a content application running on a client device (202) requests content (210) from a content server (208) and that content (210) has been cached in a proxy server (204), then the content presentation application of the client device (202) is not aware that it is retrieving cached content.

Figure 3:
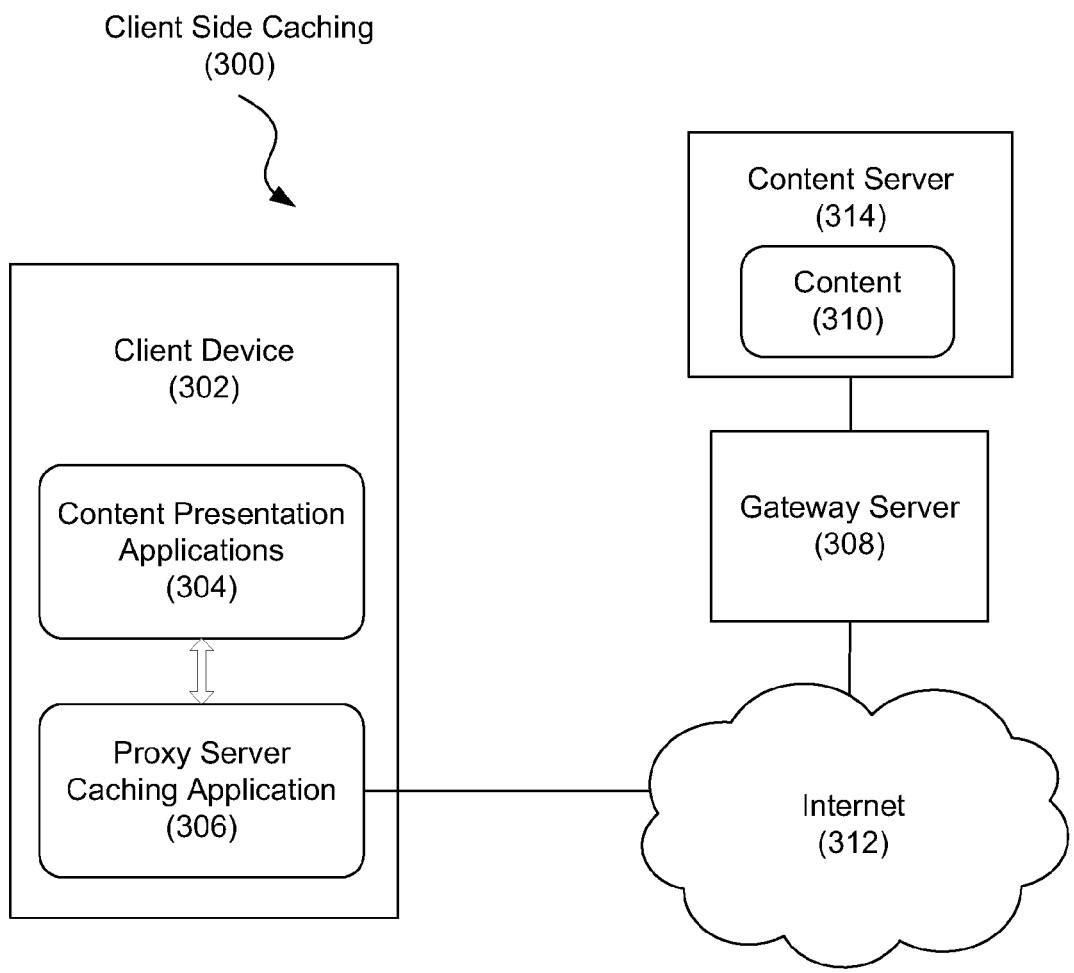
FIG. 3 is a diagram showing an illustrative client side caching process, according to one example of principles described herein.

FIG. 3 is a diagram showing an illustrative client side caching process (300). As mentioned above, there may be times when the Internet access of the client device is relatively slow. This may be due to heavy traffic on the network. It may also be the case that some geographic regions do not provide sufficient Internet access. In this case, the functionality of a simplified client device may be limited as it relies heavily on obtaining content over the network. To reduce the amount of content that is transferred over the network to a client device, the following describes a method of client side caching.

According to certain illustrative examples, a proxy server caching application (306), such as Squid, is run locally on a client device (302). The proxy server caching application (306) is then configured to act as a proxy server for local content presentation applications (304) running on the client device (302). Thus, the content presentation applications (304) will request content (310) from a content server (314) through the proxy server caching application (306). Instead of being configured to service multiple client devices, the proxy server caching application (306) is configured to service only the client device (302) on which it is running.

The content presentation applications include applications designed to display a particular type of content. For example, a content presentation application such as a music player is designed to play music content. A content presentation application such as a video player is designed to display videos. Furthermore, a content presentation application such as a web browser is designed to present Internet content in a Hyper Text Markup Language (HTML) format. The Internet content may include text such as news and other information as well as images, audio, and video content.

In some cases, a simplified client device may include a subscription to certain types of content provided by the entity that sells the simplified computing device. Such content may be accessed through a gateway server (308). A gateway server (208) is a server that allows access to particular content, whether that content (310) is stored on the gateway server or another content server (314). Thus, a client device may access the gateway server (308) through the Internet (312).

The user of a simplified computing device may subscribe to particular content provided by the entity that sells the simplified computing device. This content may be specific to the geographical region in which the simplified computing device is sold. For example, if the simplified computing device is sold to users within a particular country, then the content provided by the entity that sells the computing device may provide content that would interest users within that country. Specifically, the content may include local news as well as the music and movies that are popular within that country.

In some cases, the content included within a subscription may be time limited. For example, there may be a movie of the week or a song of the day that is intended to be available to the user for an entire week or an entire day only. The data files that represent content that is cacheable by a proxy server caching application (306) may include a file header that indicates how long the file should stay in cache. The Hyper Text Transfer Protocol (HTTP) commonly used to transport data over the Internet provides for use of file headers that include a line that indicates how many seconds a file should remain in a cache. Such lines will be referred to as cache headers. If a particular piece of content is intended to be available to a user for a particular period of time, then the provider of such content can place a cache header with that content that tells the proxy server caching system to discard that content after that particular period of time. Specifically, if the content is intended to be available for one day, than the HTTP cache header for that content may indicate that the maximum age for that content is 86,400 seconds. An example of the header line within the HTTP header would be "Cache-Control: max-age=86,400".

Figure 4A:
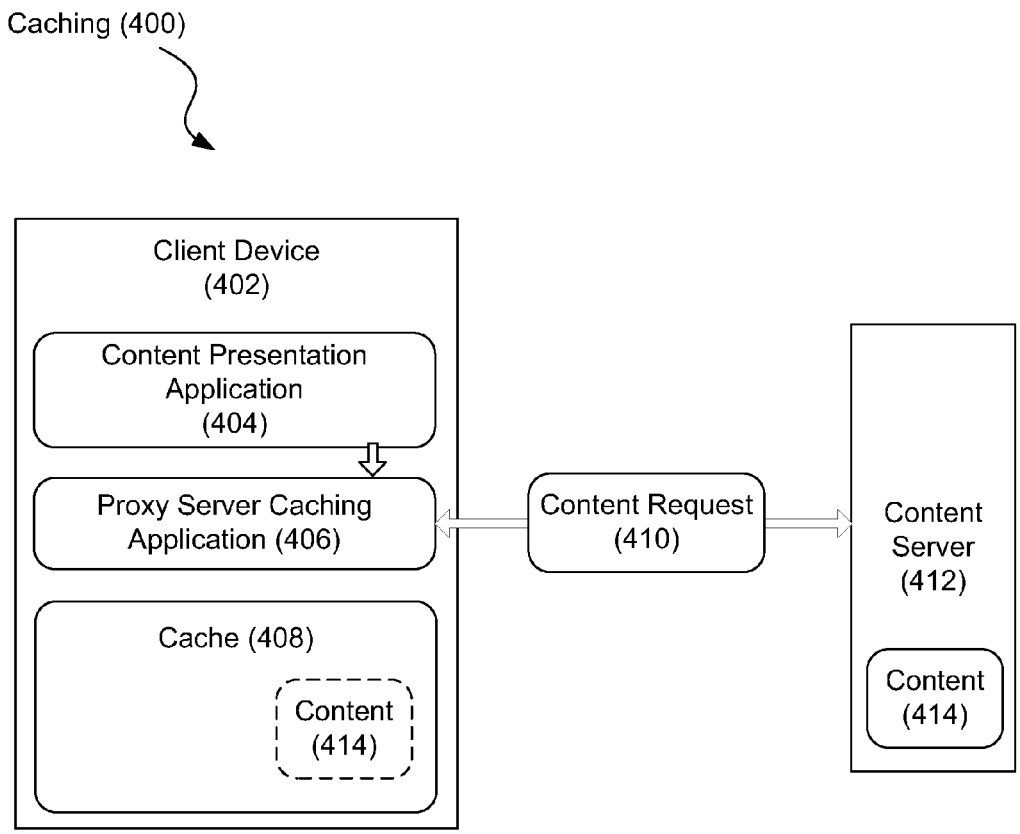
FIGS. 4A and 4B are diagrams illustrative the caching of content with a locally run proxy server application, according to one example of principles described herein.
Figure 4B:
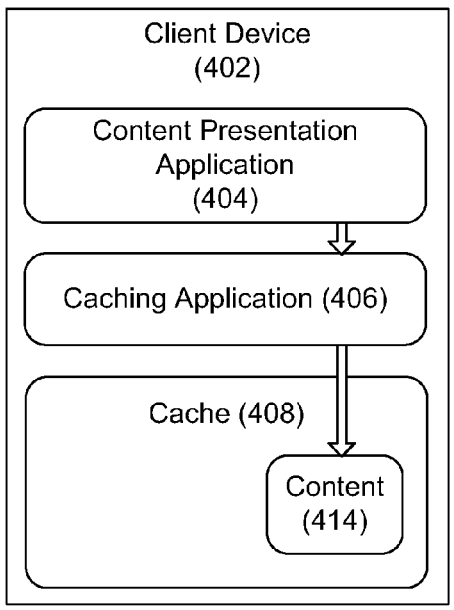

FIGS. 4A and 4B are diagrams illustrating the caching (400) of content with a locally run proxy server application. FIG. 4A illustrates the process whereby a content presentation application (404) of a client device (402) requests content (410) from a content server (412). According to certain illustrative examples, the process starts when a user of the client device (402) attempts to view a particular piece of content (414).

Through the content presentation application (404), the user will indicate the content that he or she desires to view. The content presentation application (404) will then request that content (410) from the proxy server caching application (406) which is also running on the client device. The content applications running on the client device are configured to make all outgoing requests for content through the proxy server caching application (406). The proxy server caching application (406) will then send a content request (410) to the content server (412) that holds the desired content (410) on behalf of the content presentation application (404).

Upon receiving the requested content (414) from the content server (412), the proxy server caching application will then send that content to the content presentation application that requested the content (414). That content (414) may then be displayed to the user of the client device (402). Additionally, the proxy server caching application (406) will place that content (414) into a cache system (408). The content may remain in the cache system (408) for as long as indicated by the cache header associated with that content (414).

FIG. 4B is a diagram illustrating the process whereby the content presentation application (404) requests, from the proxy server caching application (406), content (414) that is currently cached within the cache system (408). According to certain illustrative examples, the process starts when a user of the client device (402) attempts to view a particular piece of content (414).

When the user indicates that he or she desires to view a particular piece of content, the content presentation application (404) will request the content from the proxy server caching application (406). The proxy server caching application (406) will then determine whether or not the desired content is currently within the cache system (408). If it is determined that the requested content (414) is in fact cached in the cache system (408), then the proxy server caching application (406) will retrieve the content (414) from the cache system and send it to the content presentation application (404) for display to the user. This is referred to as a cache hit. If, however, the requested content (414) is not within the cache system (408), then the proxy server caching application (406) will request that content (414) from the content server (412). This is referred to as a cache miss.

Because cached content (414) is stored locally, the content (414) is provided to the user at a much faster rate because the data does not need to be transferred from the content server (412). Furthermore, if the content server (412) is unavailable due to a bad internet connection or no internet connection, then the content (414) will still be available to the user. Because this process is transparent, the content presentation application (406) does not know whether or not the content (414) was retrieved from the cache system (408). Furthermore, because all requests for content go through the proxy server caching application (406), the content presentation applications (404) do not have to use any caching mechanisms of their own. This increases the simplicity of running such content presentation applications.

Figure 5:
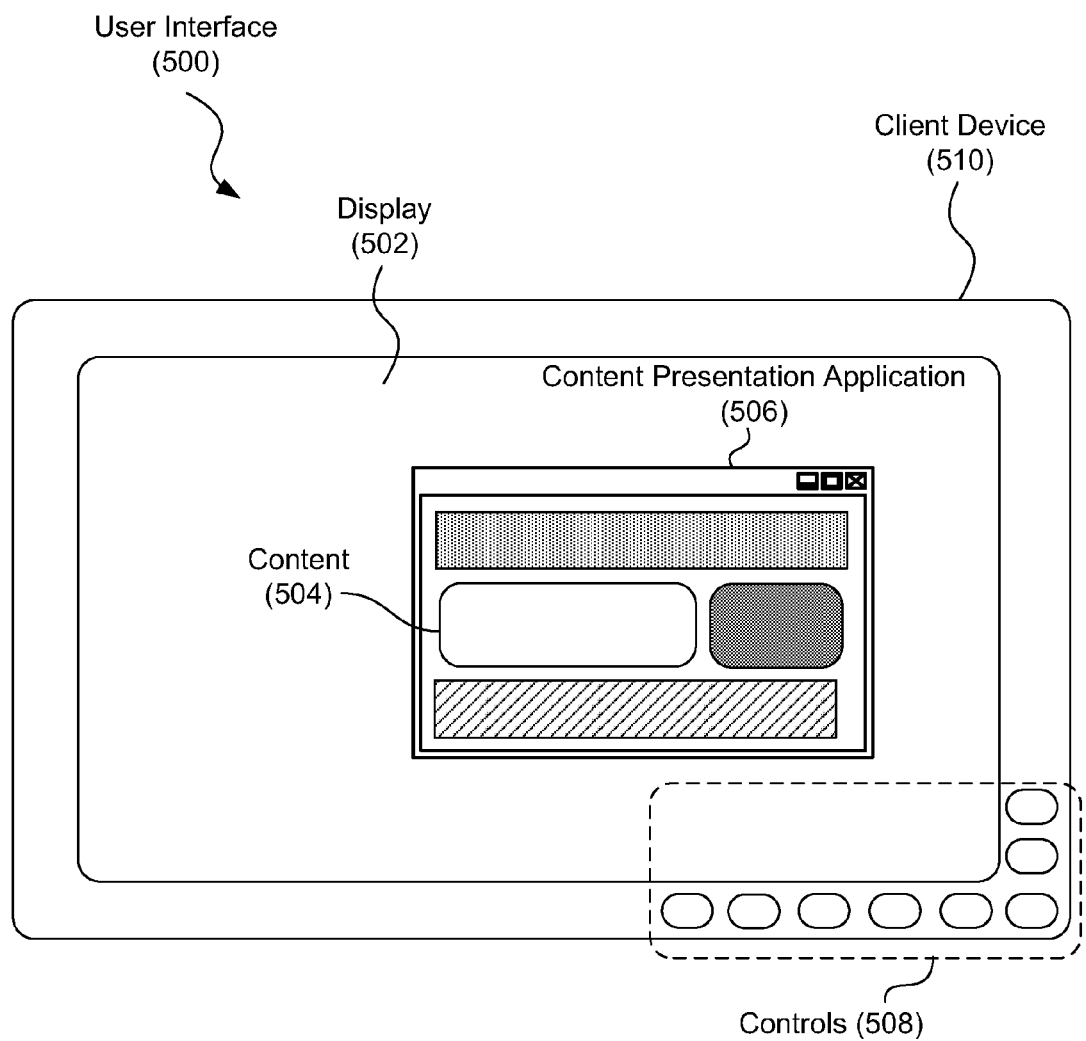
FIG. 5 is a diagram showing an illustrative user interface for a client device, according to one example of principles described herein.

FIG. 5 is a diagram showing an illustrative user interface for a client device. According to certain illustrative examples, the user interface (500) may be shown on a display (502) of a client device (510). The display (502) may be a touchscreen display. In addition to allowing human interaction through the touchscreen display (502), the client device (510) may provide a number of physical controls (508).

The display (502) may be used to provide content (504) to the user such as music, pictures, videos, and news. This content is provided through a content presentation application (506). The client device (510) may be configured to receive regional specific content (504) that is tailored to the region where the device is sold. For example, citizens of a particular country or region of that country may be interested in particular sources and types of media. The gateway server for client devices sold in that country may then be configured to provide that regionally relevant content to those client devices.

Figure 6:
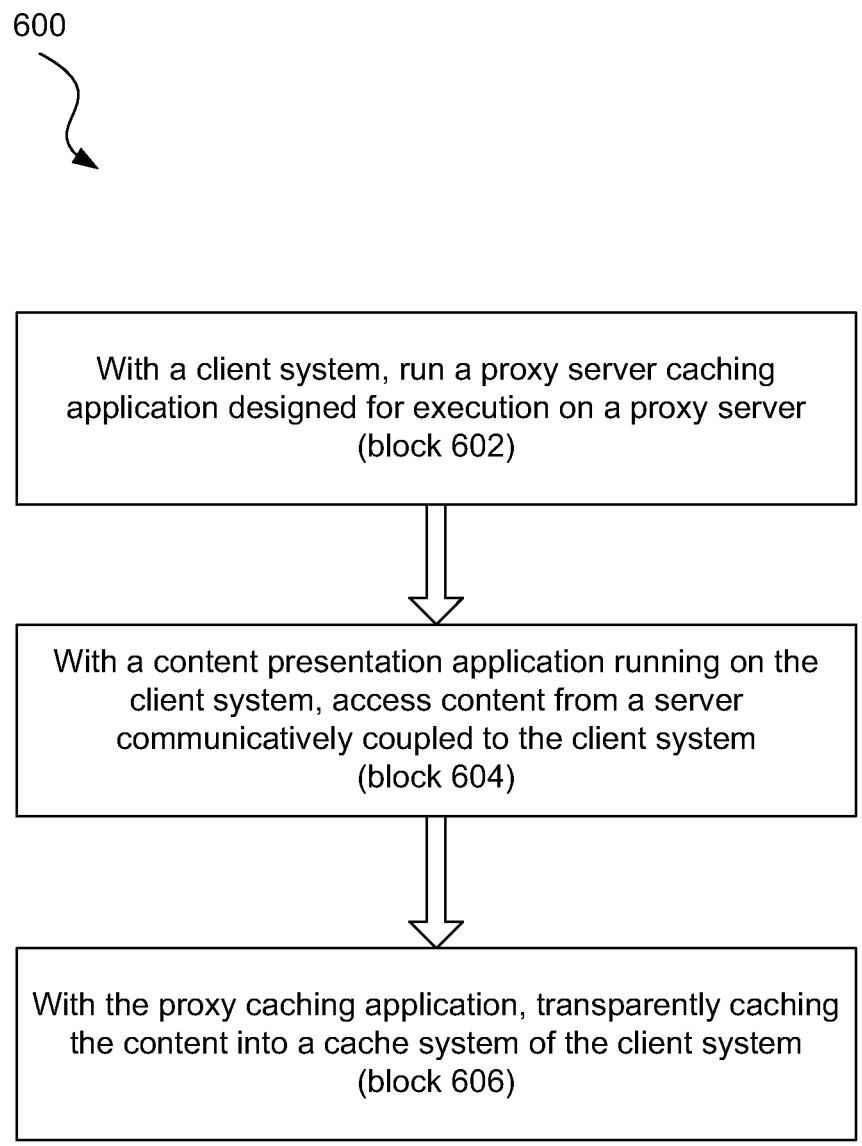
FIG. 6 is a flowchart showing an illustrative method for client side caching, according to one example of principles described herein.

FIG. 6 is a flowchart showing an illustrative method (600) for client side caching. According to certain illustrative examples, the method includes, with a client system, running (block 602) a proxy caching application designed for execution on a proxy server, with a content presentation application running on the client system, accessing (block 604) content from a server communicatively coupled to the client system, and with said proxy caching application, transparently caching (block 606) said content into a cache system of said client system.

In conclusion, through use of systems and methods embodying principles described herein, content retrieved by a client device from a content providing server will be cached locally on the client device that requests the data. As the content presentation applications running on the client device access content that has previously been accessed by the client device, the proxy server caching application will readily provide that content to those applications without having to access the Internet. Thus, the content will be provided to the user in a short amount of time and the load on the network will be reduced.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for client side caching, the method comprising:
    with a client system, running a proxy server caching application executing on a proxy server;
    with a content presentation application running on said client system, accessing content from a server communicatively coupled to said client system; and
    with said proxy caching application, transparently caching said content into a cache system of said client system, wherein said proxy server caching application running on said client system identifies said client system as the proxy server to said server.

2. The method of claim 1, wherein said content comprises regional specific content.

3. The method of claim 1, wherein said cached content comprises a cache header indicating a period of time that said cached content should remain in said cache system before being discarded.

4. The method of claim 3, wherein said period of time is according to a subscription to said content.

5. The method of claim 3, wherein said content presentation application on said client system is to access content within said cache if less than said period of time for said content has passed.

6. The method of claim 3, wherein said cache header is set by a provider of said content.

7. The method of claim 1, further comprising, with said content presentation application running on said client system, receiving user input designating specific content desired by a user and accessing that specific content from the server communicatively coupled to said client system, wherein said specific content designated by the use s, with said proxy caching application, transparently cached into said cache system of said client system.

8. The method of claim 1, wherein said client system is a simplified computing device.

9. A client computing device comprising:
    a processor; and
    a memory communicatively coupled to said processor;
    in which said processor is to:
        run, on said client computing device, a proxy, caching application executing on a proxy server; run a content presentation application that accesses content from a server; and transparently cache said content into a cache system within said memory, wherein said proxy server caching application running on said client system identifies said client system as the proxy server to said server.

10. The system of claim 9, wherein said content comprises regional specific content.

11. The system of claim 9, wherein said cached content comprises a cache header indicating a period of time that said cached content should remain in said cache system before being discarded.

12. The system of claim 11, wherein said period of time is according to a subscription to said content.

13. The system of claim 11, wherein said content presentation application on said client system is configured to access content within said cache if less than said period of time for said content has passed.

14. The system of claim 11, wherein said cache header is set by a provider of said content.

15. The system of claim 9, wherein said client system is a simplified computing system designed primarily for presentation of said content.

16. The system of claim 9, said processor to receive user input designating specific content desired by a user and, with the content presentation application, access that specific content from said server, wherein said specific content designated by the user is, with a proxy caching application, cached into said cache system.

17. The system of claim 9, wherein said processor identifies said client computing device to said server as a proxy server.

18. A method for client side caching, the method comprising:
    with a client system, running a proxy caching application executing on a proxy server;
    with a content presentation application running on said client system, receiving user input designating specific content desired by the user and accessing that specific content from a server communicatively coupled to said client system, said content comprising a cache header indicating a period of time that said content should be kept in a cache system of said client system; and
    with said proxy caching application, transparently caching said content into said cache system;
    wherein said cache headers are set by a provider of said content.

19. The method of claim 18, wherein said proxy server caching application running on said client system identifies said client system as a proxy server to said server from which content is accessed.

* * * * *

UNITED STATES PATENT AND TRADEMARK OFFICE
CERTIFICATE OF CORRECTION

PATENT NO. : 9,594,846 B2  
APPLICATION NO. : 13/208186  
DATED : March 14, 2017  
INVENTOR(S) : Sweekar Hillary Pinto et al.

Page 1 of 1

It is certified that error appears in the above-identified patent and that said Letters Patent is hereby corrected as shown below:

In the Claims

In Column 7, Line 36 approx., in Claim 7, delete "use s," and insert -- user is, --, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*